United States Patent
Akselrod et al.

(10) Patent No.: US 10,218,653 B2
(45) Date of Patent: Feb. 26, 2019

(54) COGNITIVE ANALYSIS OF MESSAGE CONTENT SUITABILITY FOR RECIPIENTS

(71) Applicant: International Business Machines Corporation, Armonk, NY (US)

(72) Inventors: Ben Z. Akselrod, Givat Shmuel (IL); Anthony Di Loreto, Ontario (CA); Steve McDuff, Ontario (CA); Kyle D. Robeson, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 230 days.

(21) Appl. No.: 15/245,273

(22) Filed: Aug. 24, 2016

(65) Prior Publication Data

US 2018/0063047 A1 Mar. 1, 2018

(51) Int. Cl.
| G06F 15/16 | (2006.01) |
| --- | --- |
| H04L 12/58 | (2006.01) |
| G06N 5/04 | (2006.01) |
| G06F 17/27 | (2006.01) |

(52) U.S. Cl.
CPC .......... *H04L 51/063* (2013.01); *G06N 5/048* (2013.01); *G06F 17/2785* (2013.01)

(58) Field of Classification Search
CPC ..... G06F 17/21; G06F 17/2785; G06N 5/048; H04L 51/063
USPC ......................................................... 709/206
See application file for complete search history.

(56) References Cited

U.S. PATENT DOCUMENTS

| 6,775,689 | B1 * | 8/2004 | Raghunandan | G06Q 10/107 709/204 |
| --- | --- | --- | --- | --- |
| 6,832,245 | B1 | 12/2004 | Isaacs et al. | |
| 8,103,726 | B2 * | 1/2012 | Stoddard | G06Q 10/107 709/206 |
| 9,195,996 | B1 * | 11/2015 | Walsh | H04L 51/32 |
| 2004/0203949 | A1 * | 10/2004 | Nielsen | G06Q 10/107 455/466 |
| 2005/0060643 | A1 * | 3/2005 | Glass | G06F 17/241 715/205 |
| 2006/0277195 | A1 * | 12/2006 | Schulz | G06Q 10/107 |
| 2007/0050455 | A1 | 3/2007 | Yach et al. | |
| 2015/0030152 | A1 | 1/2015 | Waxman et al. | |
| 2017/0026514 | A1 * | 1/2017 | Dwyer | H04M 3/5175 |
| 2017/0109340 | A1 * | 4/2017 | Chen | G06F 17/248 |

OTHER PUBLICATIONS

"Recommending Recipients in the Enron Email Corpus" by Vitor et al., 200X, ACM, pp. 1-10.*
Curtis Qingwei Ge; Email recipient recommendation system, Jan. 3, 2013.

* cited by examiner

*Primary Examiner* — Phuoc H Nguyen
(74) *Attorney, Agent, or Firm* — Garg Law Firm, PLLC; Rakesh Garg; Isaac Gooshaw

(57) ABSTRACT

A set of characteristics is constructed corresponding to a content of a message. For a characteristic in the set of characteristics, a skill factor is computed that is needed to achieve a degree of comprehension of the content having the characteristic. A gap is computed between the skill factor corresponding to the characteristic and a skill factor associated with a recipient of the message. An annotation is selected in response to evaluating that the gap exceeds a tolerance value. The annotation is applied in the message to an identifier of the recipient.

20 Claims, 5 Drawing Sheets

COGNITIVE ANALYSIS OF MESSAGE CONTENT SUITABILITY FOR RECIPIENTS

TECHNICAL FIELD

The present invention relates generally to a method, system, and computer program product for determining whether the recipients will be able to understand the contents of a message. More particularly, the present invention relates to a method, system, and computer program product for cognitive analysis of message content suitability for recipients.

BACKGROUND

Cognitive analytics is the process of analyzing available information or knowledge to create, infer, deduce, or derive new information. A natural language is a written or a spoken language having a form that is employed by humans for primarily communicating with other humans or with systems having a natural language interface.

Natural language processing (NLP) is a technique that facilitates exchange of information between humans and data processing systems. For example, one branch of NLP pertains to transforming human readable or human understandable content into machine usable data. For example, NLP engines are presently usable to accept input content such as a text content or human speech, and produce structured data, such as an outline of the input content, most significant and least significant parts, a subject, a reference, dependencies within the content, and the like, from the given content.

Another branch of NLP pertains to answering questions about a subject matter based on information available about the subject-matter domain. This branch of cognitive analytics using NLP is implemented as a Question and Answer system (Q and A system).

Hereinafter, a "message" is any form of electronic communication from a sending user (sender) to one or more receiving users (recipient, recipients), unless expressly disambiguated where used. For example, a message may take the form of an email or a social media post or comment. As another example, a message may not take the form of a publication, such as a blog post or other types of communication where the message is not targeted at any particular recipient but to an unspecified audience at large.

Generally, a sender composes a message by selecting a set of recipients and putting together the content the sender intends to share with the set of recipients. In many cases, while the sender is knowledgeable about the content of the message, a recipient might not be knowledgeable or skilled enough to sufficiently comprehend the content of the message.

For example, an email message may include technical or subject-matter domain-specific content. A recipient of that content may not be technically skilled, may not have a level of expertise in the skill, may not be familiar with the subject-matter, or some combination thereof. Accordingly, the content, or the manner in which the content is presented in the message may not be suitable for the recipient's skill, skill level, or domain knowledge. Presently, the sender has no way of knowing whether all the selected recipients of the message have the needed skill set to be able to sufficiently read, understand, and/or interpret the content of the message.

SUMMARY

The illustrative embodiments provide a method, system, and computer program product. An embodiment includes a method that constructs a set of characteristics corresponding to a content of a message. The embodiment computes, for a characteristic in the set of characteristics, a skill factor that is needed to achieve a degree of comprehension of the content having the characteristic. The embodiment computes, using a processor and a memory, a gap between the skill factor corresponding to the characteristic and a skill factor associated with a recipient of the message. The embodiment selects an annotation responsive to evaluating that the gap exceeds a tolerance value. The embodiment applies, in the message, the annotation to an identifier of the recipient.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments used to describe the invention generally address and solve the above-described problems and other problems related to matching the content of a message with the abilities of the recipients.

An embodiment can be implemented as a software application. The application implementing an embodiment can be configured as a modification of an existing messaging system, as a separate application that operates in conjunction with an existing messaging system, a standalone application, or some combination thereof.

Only for the clarity of the description and not to imply any limitation thereto, the operations of the various embodiments are described using an email message as an example. An embodiment can be adapted for other forms of messages that can be sent to specified recipients and such adaptations are contemplated within the scope of the illustrative embodiments.

An example messaging system may be an email system or application that presents a message interface to a sender. The sender can compose the content of an email, select one or more recipients for the email, and send the email from the message interface.

An embodiment detects that some content is being sent to some recipients in a message. The embodiment analyzes the content of the message. For example, the embodiment uses one or more known NLP techniques to identify a set of characteristics of the content. A characteristic of a content of a message can be, but is not limited to, a keyword in the content, a language of the content, a style of writing of the content, a complexity of the content, vocabulary or terms-of-art used in the content, subject-matter of the content, and a complexity of the subject-matter domain of the content.

A keyword is a word in the content that is significant for understanding the content. A language of the content can be a natural language or a computer programming language, e.g., when the content includes code that the sender may want the recipient to review. A style of writing of the content can take the form of simple sentences up to a threshold number of words, complex sentences longer than the threshold number of words, sentences including references to other documents or parts within or outside the content, sentences written in an unusual grammatical structure, and the like. A complexity of the content is a level of detail in the information communicated by the content. A vocabulary of the content is a set of special-use words, such as terms-of-art. a subject-matter of the content is a field of endeavor of the content and knowledge pertaining thereto. A complexity of the subject-matter domain is a level of specialized knowledge generally required to comprehend information pertaining to the subject-matter domain.

For a characteristic of a given content, an embodiment computes a type and/or a level of a particular skill that a recipient should possess in order to comprehend the content. For example, if the content includes Java™ code, the recipient should have Java in the recipient's skill set. Furthermore, if the code includes a method call in Java, the level of the Java skill may have to be at least at a basic level, e.g., 1-3 on a 1-10 scale of skill level; however, if the content includes a delegate according to Model-View-Control (MVC) paradigm in Java, the level of the Java skill may have to be at least at a mid-to advanced level, e.g., 6-10 on a 1-10 scale of skill level (Java and all Java-based trademarks and logos are trademarks or registered trademarks of Oracle Corporation and/or its affiliates). In a similar manner, different characteristics may have different types of skills, level of expertise in a type of skill, or both, associated therewith. A type and/or a level of expertise in a skill are collectively and interchangeably referred to as a skill factor.

In one embodiment, the characteristic-to-skill association may be predefined in a mapping repository. The mapping repository may include any number of 1-1, 1-n, and n-m mappings between one or more characteristics and one or more skill factors.

In another embodiment, the characteristic-to-skill association may be dynamically computed using a Q and A system. For example, given a characteristic of a content and a Q and A system trained in the subject-matter domain of the content, the Q and A system is asked a question—what skill factor is likely to be needed to understand the content with the given characteristic? To such a question, the Q and A system produces an answer, the answer containing a skill factor with a corresponding likelihood of the correctness of the answer.

Operating in this manner, an embodiment computes a set of skill factors for a corresponding set of characteristics of a given content of a message. An embodiment further computes whether a recipient of the message has or possesses the determined set of skill factors. If a skill factor of a recipient does not match a skill factor in the determined set, the embodiment computes a gap or difference between the recipient's skill factor and the determined skill factor. For example, Java as a skill may be entirely missing in a recipient, or a skill level of 6-10 may have been determined from the content but the recipient may have a skill level of 1-3 in Java.

The embodiment quantifies the gap using a quantification function. In other words, when a gap exists between a skill factor computed for the content and a skill factor possessed by a recipient, the embodiment computes a numeric value that corresponds to the size, severity, or importance of the gap, or a combination of these and other considerations.

In one embodiment, a repository of personnel-skills is maintained. The personnel-skill repository includes a recipient as personnel, and defines or specifies a set of skill factors the recipient possesses. The embodiment uses the personnel-skills repository to compute the gap described herein.

Prior to sending the message with the content, an embodiment annotates in the message a recipient who has a corresponding non-null quantified gap in at least one skill factor. The embodiment uses the quantified gap of the recipient to select a suitable annotation for the recipient. For example, if the quantified gap is up to a first threshold value, then the annotation may be a graphic to represent a low level warning about the gap; if the quantified gap is more than the first threshold value but less than a second threshold value, then the annotation may be a graphic to represent a high level warning about the gap; and if the quantified gap is more than the second threshold value, then the annotation may be a graphic to represent an unacceptability of the gap. Such annotations allow the sender to reconsider whether to include the annotated recipient, remove the recipient from the message, or take another action. For example, the sender can choose to revise the content such that the gap between the skill factor of the recipient and the skill factor computed for the content is reduced.

A recipient can be annotated or identified in any suitable manner within the scope of the illustrative embodiments, such as by using different fonts, colors, fills, icons, graphics, animations, and other techniques in a manner described with respect to an embodiment. Furthermore, any number of thresholds or other methods of selecting an annotation can be used without departing the scope of the illustrative embodiments.

One embodiment also suggests a change in the content to revise the content such that the gap between the skill factor of the recipient and the skill factor computed for the content is reduced. For example, if a term-of-art is used in the original content of a message, which causes a gap for a recipient, the embodiment can be configured to suggest a synonym or other replacement for the term. The sender can then provide an input to select the suggested change to form a revised content, which may be more suitable for the recipient in question as compared to the original content.

The manner of cognitive analysis of message content suitability for recipients described herein is unavailable in the presently available methods. A method of an embodiment described herein, when implemented to execute on a device or data processing system, comprises substantial advancement of the functionality of that device or data processing system in ensuring that the content of a message matches as closely as possible to the skills of the intended recipients of the message.

The illustrative embodiments are described with respect to certain types of messages, content, recipients, skills, skill types, skill levels, quantifications, annotations, suggestions, repositories, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
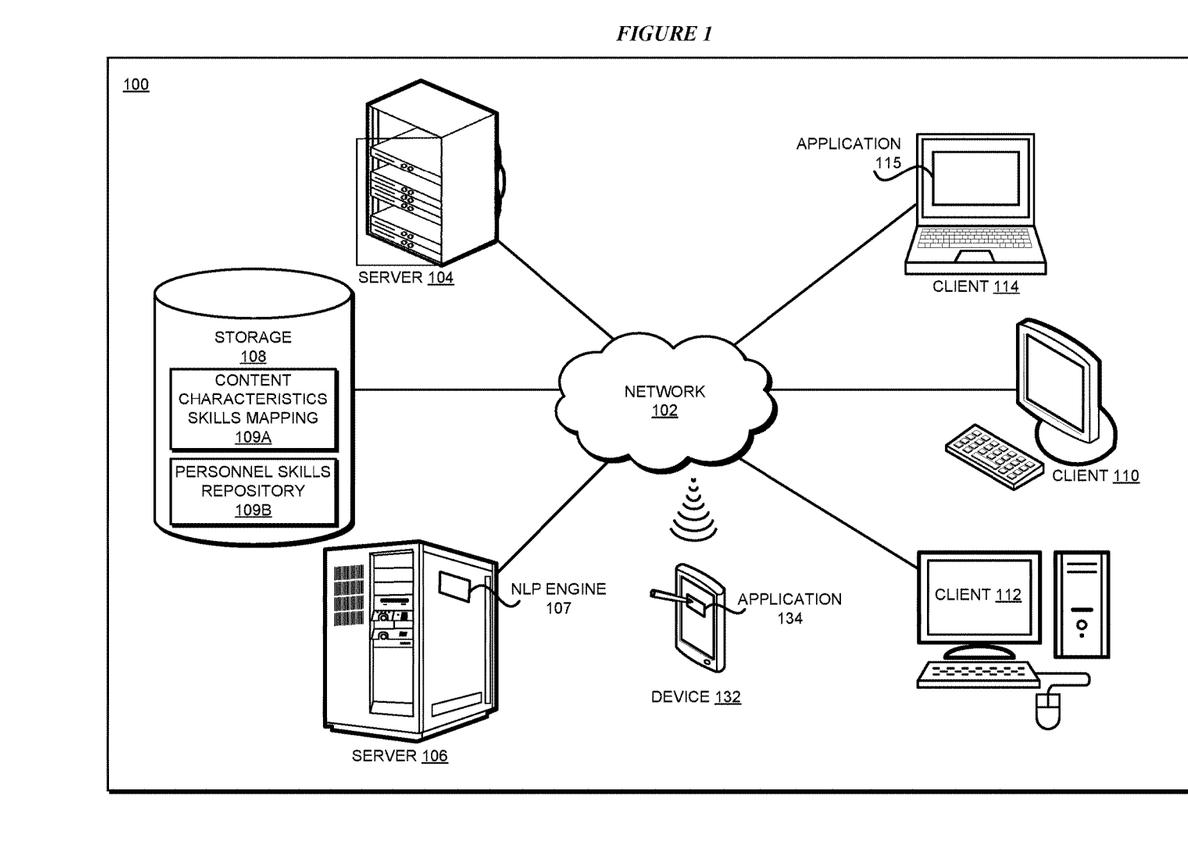
FIG. 1 depicts a block diagram of a network of data processing systems in which illustrative embodiments may be implemented.
Figure 2:
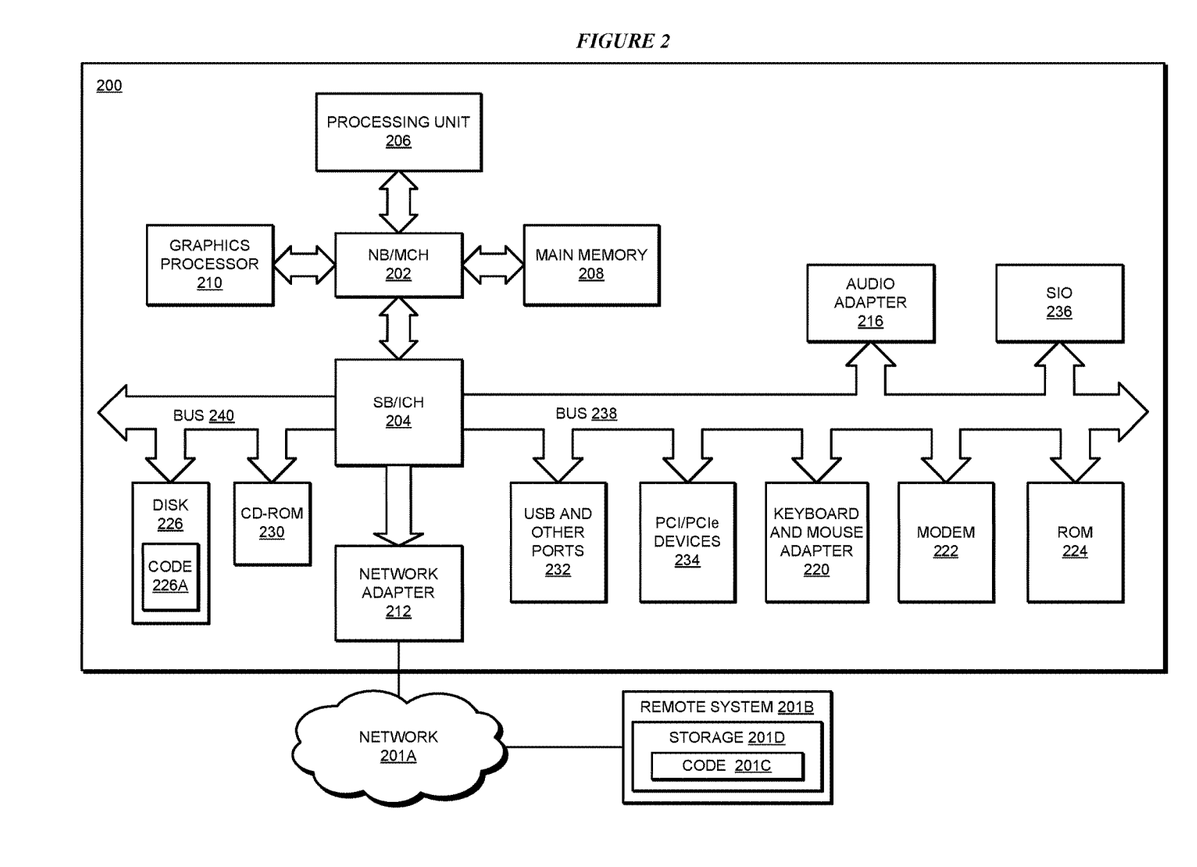
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 115 or application 134 implements an embodiment described herein. For example, application 115 or 134 accesses NLP engine 107 over data network 102 to process the content and determine the content characteristics in a manner described herein. When a Q and A system is used (not shown), the Q and A system can be similarly accessed over network 102. Application 115 or 134 uses mappings 109A to determine one or more skill factors corresponding to the content. Application 115 or 134 uses repository 109B to compute and quantify a gap for a recipient as described herein. In some cases, it may be possible to configure NLP engine 107 and/or a Q and A system on the same data processing system where application 115 or 134 may be executing. It may also be possible to configure all or a portion of mappings 109A and/or repository 109B on the same data processing system where application 115 or 134 may be executing.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 115 or 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
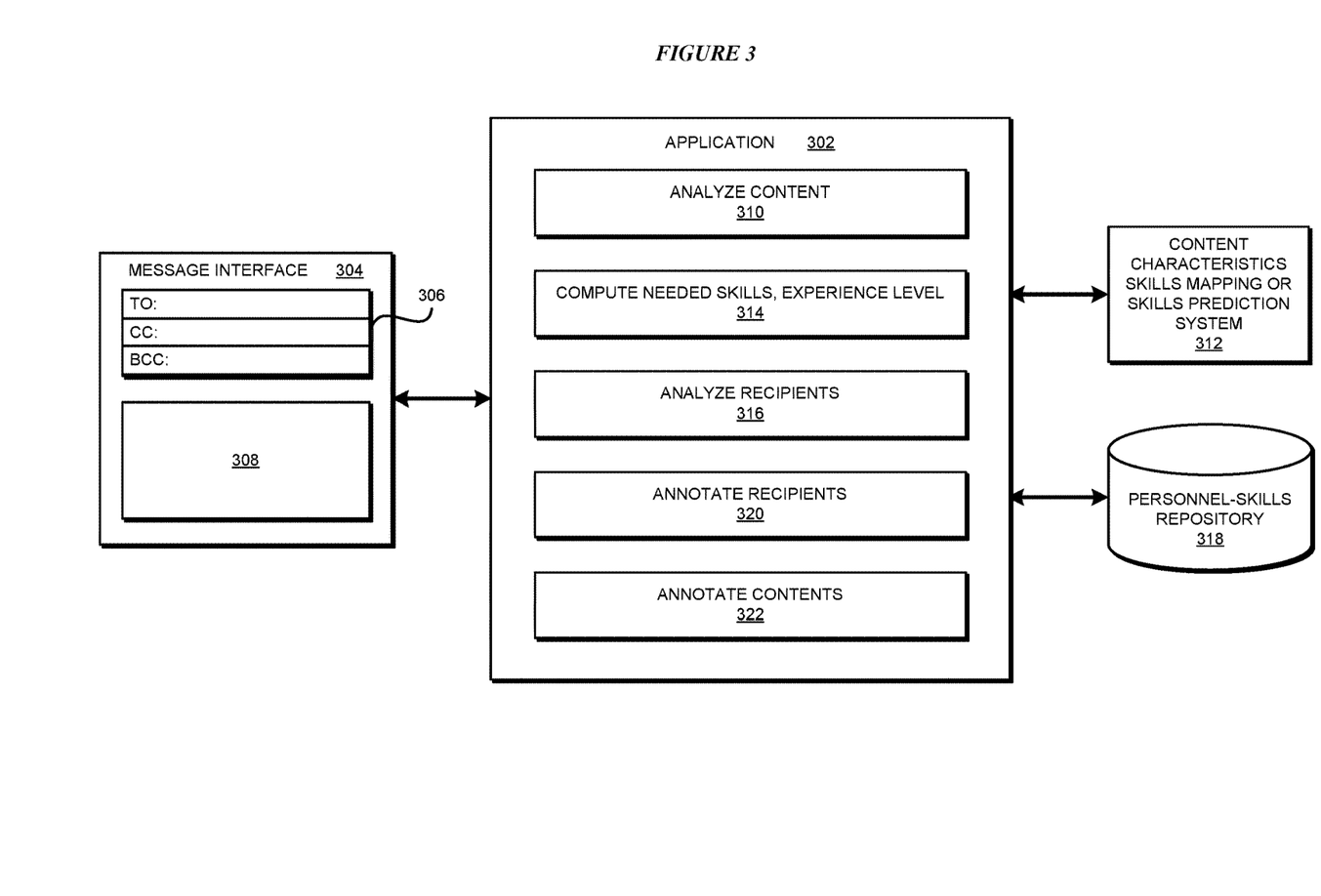
FIG. 3 depicts a block diagram of an example configuration for cognitive analysis of message content suitability for recipients in accordance with an illustrative embodiment.

With reference to FIG. 3, this figure depicts a block diagram of an example configuration for cognitive analysis of message content suitability for recipients in accordance with an illustrative embodiment. Application 302 is an example of application 115 or 134 in FIG. 1.

As a non-limiting example, message interface 304 is depicted as an email interface, using which a sender can send an email message to a recipient. For example, address area 306 allows the sender to specify one or more recipients for the content that the sender composes in content area 308.

Component 310 analyzes the content in content area 308. For example, component 310 extracts or otherwise computes a set of characteristics corresponding to the content in content area 308. Mapping 312 is an example of characteristics-skills mappings 109A in FIG. 1. When a Q and A system is used to determine the skills factors corresponding to the content in content area 308, mappings 312 can be substituted or augmented with the Q and A system for skill factors prediction. Using mappings or prediction system 312, component 314 computes a set of skill factors needed for a desired level of understanding the content in content area 308.

Component 316 analyzes a recipient specified in address area 306. Particularly, component 316 uses repository 318, which is an example of repository 109B in FIG. 1, to compute a gap in a skill factor of the recipient, as described herein.

Component 320 selects an annotation corresponding to the recipient. Specifically, component 320 determines whether the gap exceeds a tolerance value. When the gap exceeds the tolerance value, component 320 selects a suitable manner of annotating the recipient according to the gap in the recipient's skill factor or factors. Note that the annotation can be indicative of a single gap in a single skill factor, or of a combination of a plurality of gaps in a corresponding plurality of skill factors. Component 320 annotates the recipient in address area 306 using the selected manner of annotation.

Optionally, component 322 can annotate the content in content area 308. For example, in a manner described herein, component 322 suggests a change in the content to revise the content such that the gap between the skill factor of the recipient and the skill factor computed for the content is reduced. In order to make such a suggestion, component 322 may be configured to access a library or a knowledgebase (not shown) where the possible substitutions for various portions of the content may be available. A language of the content can also be changed, such as from English to French, in a similar manner by suggesting French substitutions for English words or phrases in the content.

Figure 4:
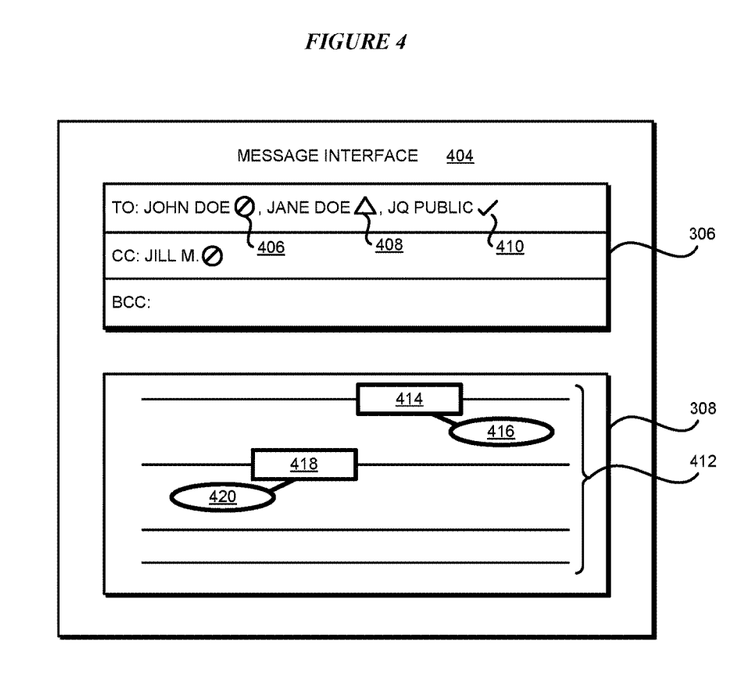
FIG. 4 depicts a block diagram of some example annotations in accordance with an illustrative embodiment.

With reference to FIG. 4, this figure depicts a block diagram of some example annotations in accordance with an illustrative embodiment. Message interface 404 is an example of message interface 304 in FIG. 3.

Only as some non-limiting examples, graphical annotations are depicted in this figure. An example of annotation selection based on gap quantification is described in this disclosure using a first threshold and a second threshold.

For example, suppose that for recipient John Doe, application 302 computes a quantified gap in a skill factor, or a cumulative quantified gap in more than one skill factors. Further suppose that the quantified gap for John Doe exceeds the second threshold. Accordingly, application 302 determines that the gap is unacceptable. In other words, the content is unacceptably unsuitable for recipient John Doe. Accordingly, application 302 selects graphical icon 406 that is designated for indicating such unsuitability in this example depiction.

In a similar manner, suppose that for recipient Jane Doe, application 302 computes a quantified gap in a skill factor, or a cumulative quantified gap in more than one skill factors. Further suppose that the quantified gap for Jane Doe exceeds the first threshold but is less than the second threshold. Accordingly, application 302 determines that the gap justifies a high-level warning. In other words, the content is unsuitable for recipient Jane Doe beyond a certain degree of unsuitability. Accordingly, application 302 selects graphical icon 408 that is designated for indicating such unsuitability.

In a similar manner, suppose that for recipient JQ Public, application 302 computes a quantified gap in a skill factor, or a cumulative quantified gap in more than one skill factors. Further suppose that the quantified gap for JQ Public does not exceed a tolerance value. In other words, the content is suitable for recipient JQ Public. Accordingly, application 302 selects graphical icon 410 that is designated for indicating such suitability.

When application 302 is configured to also annotate the content, e.g., content 412 in content area 308 of message interface 404, the application may make suggestions for content changes by using any suitable annotation. The suggestions can be accompanied by any number or types of annotation features, such as font types, colors, animations, and many others that are described herein or may be conceivable from this disclosure to those of ordinary skill in the art.

In the example depiction, suppose that application 302 suggests changing portion 414 of content 412. Accordingly, application 302 presents alternative 416 in any suitable manner for the sender to recognize the suggestion. Similarly, application 302 can suggest changing portion 418 of original content 412 to alternative content portion 420. Any number or types of suggestions can be made in a similar manner.

In some cases, the content analysis, the recipient analysis, the annotation, or some combination thereof, can be done on-the-fly, i.e., as the recipients are added, as the content is edited, or both. In other cases, the content analysis, the recipient analysis, the annotation, or some combination thereof, can be done prior to sending the content, i.e., after the content has been fully composed, recipients have been added, and an input to send the message has been provided by the sender.

Figure 5:
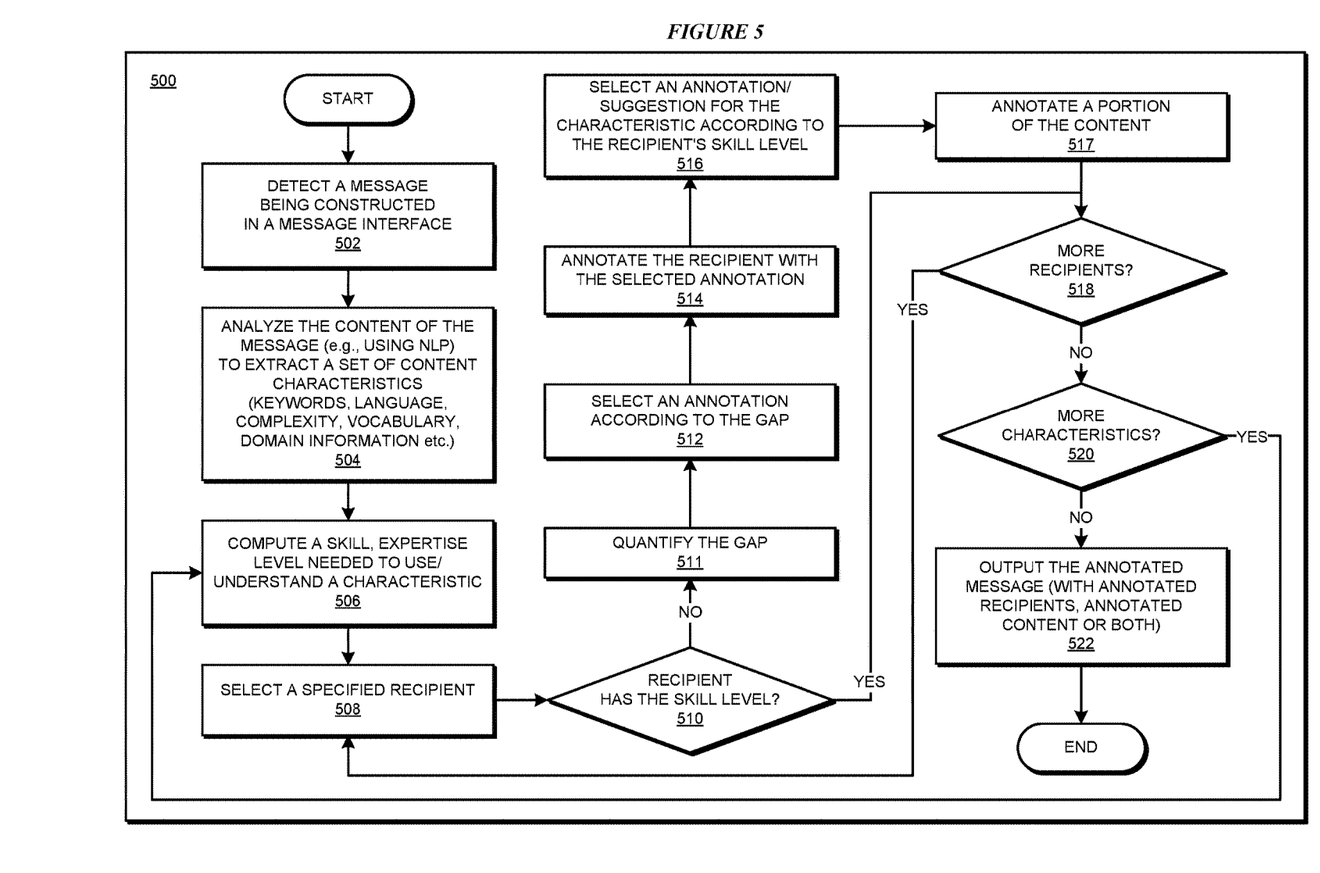
FIG. 5 depicts a flowchart of an example process for cognitive analysis of message content suitability for recipients in accordance with an illustrative embodiment.

With reference to FIG. 5, this figure depicts a flowchart of an example process for cognitive analysis of message content suitability for recipients in accordance with an illustrative embodiment. Process 500 can be implemented in application 302 in FIG. 3.

The application detects that a message is constructed in a message interface (block 502). The application analyzes the content of the message to compute a set of content characteristics (block 504).

The application computes a skill factor associated with a content characteristic (block 506). The application selects a specified recipient (block 508).

The application determines whether the selected recipient has the computed skill factor, i.e., whether the gap between the skill factor of the recipient and the computed skill factor is less than a tolerance value (block 510). If the recipient has the skill factor ("Yes" path of block 510), the application proceeds to block 518.

If the recipient does not have the skill factor, i.e., the gap exceeds the tolerance ("No" path of block 510), the application quantifies the gap (block 511). The application selects an annotation according to the quantified gap (block 512).

The application annotates the recipient with the selected annotation (block 514). Optionally, the application also selects an annotation for the content characteristic, e.g., a suggested alternative of a phrase or language, (block 516). The application uses the selected content annotation to annotate a portion of the content that corresponds to the characteristic (block 517).

The application determines whether more recipients have to be analyzed in this manner (block 518). If more recipients have to be analyzed in this manner ("Yes" path of block 518), the application returns to block 508. If no more recipients have to be analyzed in this manner ("No" path of block 518), the application determines whether more characteristics of the content have to be analyzed in this manner (block 520).

If more characteristics of the content have to be analyzed in this manner ("Yes" path of block 520), the application returns to block 506. If no more characteristics of the content have to be analyzed in this manner ("No" path of block 520), the application outputs the annotated message—with annotated recipients, annotated content, or both (block 522). The application ends process 500 thereafter.

Thus, a computer implemented method, system or apparatus, and computer program product are provided in the illustrative embodiments for cognitive analysis of message content suitability for recipients and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
  modifying a message interface of a messaging system, the modifying comprising:
    computing, using a processor and a memory, a set of characteristics corresponding to a content of a message;
    computing, for a characteristic in the set of characteristics, a skill factor that is needed to achieve a degree of comprehension of the content having the characteristic;
    computing, using a processor and a memory, a gap between the skill factor corresponding to the characteristic and a skill factor associated with a recipient of the message;
    selecting an annotation responsive to evaluating that the gap exceeds a first tolerance value; and
    applying, in the message, the annotation to an identifier of the recipient.

2. The method of claim 1, further comprising:
  selecting, responsive to evaluating that the gap exceeds a first tolerance value, a content annotation, the content annotation corresponding to the characteristic; and
  applying the content annotation to a portion of the content, the portion corresponding to the characteristic.

3. The method of claim 1, further comprising:
  quantifying the gap to a gap value, wherein the annotation corresponds to a relationship of the gap value relative to the first tolerance value and a second tolerance value higher than the first tolerance value.

4. The method of claim 1, wherein the skill factor corresponding to the characteristic and the skill factor associated with the recipient are each related to a common skill.

5. The method of claim 1, wherein the skill factor comprises a type of a skill.

6. The method of claim 1, wherein the skill factor comprises a level of expertise in a skill.

7. The method of claim 1, further comprising:
  detecting that the content is being edited; and
  further detecting that the recipient has been added in the message, wherein the annotating is responsive to the detecting that the recipient has been added.

8. The method of claim 1, further comprising:
  detecting an input to send the message to the recipient, wherein the annotating is responsive to the detecting the input.

9. The method of claim 1, further comprising:
  analyzing, to perform the computing, the content using Natural Language Processing (NLP).

10. The method of claim 9, wherein the analyzing identifies a word in the content, the word forming a characteristic in the set of characteristics.

11. The method of claim 9, wherein the analyzing identifies a language of the content, the language forming a characteristic in the set of characteristics.

12. The method of claim 9, wherein the analyzing identifies a style of writing of the content, the style of writing forming a characteristic in the set of characteristics.

13. The method of claim 9, wherein the analyzing identifies a complexity of the content, the complexity forming a characteristic in the set of characteristics.

14. The method of claim 9, wherein the analyzing identifies a subject-matter of the content, the subject-matter forming a characteristic in the set of characteristics.

15. The method of claim 9, wherein the analyzing identifies a complexity of a subject-matter domain of the content, the complexity of the subject-matter domain forming a characteristic in the set of characteristics.

16. A computer usable program product comprising one or more computer-readable storage devices, and program instructions stored on at least one of the one or more storage devices, the stored program instructions comprising:
   program instructions to modify a message interface of a messaging system, the modifying comprising:
      program instructions to compute, using a processor and a memory, a set of characteristics corresponding to a content of a message;
      program instructions to compute, for a characteristic in the set of characteristics, a skill factor that is needed to achieve a degree of comprehension of the content having the characteristic;
      program instructions to compute, using a processor and a memory, a gap between the skill factor corresponding to the characteristic and a skill factor associated with a recipient of the message;
      program instructions to select an annotation responsive to evaluating that the gap exceeds a tolerance value; and
      program instructions to apply, in the message, the annotation to an identifier of the recipient.

17. The computer usable program product of claim 16, further comprising:
   program instructions to select, responsive to evaluating that the gap exceeds a tolerance value, a content annotation, the content annotation corresponding to the characteristic; and
   program instructions to apply the content annotation to a portion of the content, the portion corresponding to the characteristic.

18. The computer usable program product of claim 16, wherein the computer usable code is stored in a computer readable storage device in a data processing system, and wherein the computer usable code is transferred over a network from a remote data processing system.

19. The computer usable program product of claim 16, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to modify a message interface of a messaging system, the modifying comprising:
      program instructions to compute, using a processor and a memory, a set of characteristics corresponding to a content of a message;
      program instructions to compute, for a characteristic in the set of characteristics, a skill factor that is needed to achieve a degree of comprehension of the content having the characteristic;
      program instructions to compute a gap between the skill factor corresponding to the characteristic and a skill factor associated with a recipient of the message;
      program instructions to select an annotation responsive to evaluating that the gap exceeds a tolerance value; and
      program instructions to apply, in the message, the annotation to an identifier of the recipient.

* * * * *